United States Patent
Park et al.

(10) Patent No.: US 9,962,726 B2
(45) Date of Patent: May 8, 2018

(54) DIPPING BATH (71) Applicant: LG CHEM, LTD., Seoul (KR)

(72) Inventors: WonChan Park, Daejeon (KR);
De-Hee Kim, Daejeon (KR); Ye-Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 75 days.

(21) Appl. No.: 14/287,758

(22) Filed: May 27, 2014

(65) Prior Publication Data

US 2014/0299053 A1 Oct. 9, 2014

Related U.S. Application Data (63) Continuation of application No. PCT/KR2013/005583, filed on Jun. 25, 2013.

(30) Foreign Application Priority Data

Jul. 5, 2012 (KR) ........................ 10-2012-0073402

(51) Int. Cl.
*B05C 3/02* (2006.01)
*B05C 3/132* (2006.01)
*H01M 2/14* (2006.01)

(52) U.S. Cl.
CPC ............... *B05C 3/02* (2013.01); *B05C 3/132* (2013.01); *H01M 2/145* (2013.01)

(58) Field of Classification Search
None
See application file for complete search history.

(56) References Cited

U.S. PATENT DOCUMENTS

| 8,163,334 | B2 | 4/2012 | Okamoto et al. |
| 2002/0071913 | A1 | 6/2002 | Jen |
| 2010/0163421 | A1 | 7/2010 | Krishna et al. |
| 2012/0114853 | A1* | 5/2012 | Schmitz ............ B05C 3/18 427/230 |

FOREIGN PATENT DOCUMENTS

| CN | 101171707 A | 4/2008 | |
| EP | 0510463 A1 | 10/1992 | |
| JP | 5799365 A | 6/1982 | |
| JP | 2569600 A | 10/1986 | |
| JP | H03288580 A | 12/1991 | |
| JP | 2569600 B2 * | 1/1997 | ............... B05C 3/02 |
| JP | 2002158004 A | 5/2002 | |

(Continued)

*Primary Examiner* — Jethro M Pence
(74) *Attorney, Agent, or Firm* — Dentons US LLP (57) ABSTRACT

A dipping bath according to the present disclosure includes a body to hold a slurry for dip coating, an inlet installed to flow the slurry from an outside of the body to an inside, and an outlet installed to discharge the slurry from the inside of the body to the outside, and one end of the inlet placed inside the body may be disposed facing a side surface of the body at a distance and may be tilted to a predetermined angle in a direction toward a bottom surface of the body.

According to the present disclosure, adjustment of an incidence angle of the slurry flowing into the bath through the inlet may increase a flow rate of the slurry toward the bottom surface, as well as allowing a uniform distribution of solids contained in the slurry circulating through the bath.

7 Claims, 9 Drawing Sheets

(56) References Cited

FOREIGN PATENT DOCUMENTS

| | | |
|---|---|---|
| JP | 2002192054 A | 7/2002 |
| JP | 2006104510 A | 4/2006 |
| KR | 100867553 | 11/2008 |
| KR | 10-2010-0024977 | 3/2010 |
| KR | 10-2012-0014388 | 2/2012 |

* cited by examiner

DIPPING BATH

This application is a Continuation Bypass of International Application No. PCT/KR2013/005583, filed Jun. 25, 2013, and claims the benefit of Korean Application No. 10-2012-0073402, filed on Jul. 5, 2012, all of which are hereby incorporated by reference in their entirety for all purposes as if fully set forth herein.

TECHNICAL FIELD

The present disclosure relates to a dipping bath, and more particularly, to a dipping bath having a structure of allowing a uniform distribution of a slurry therein and increasing a flow rate of the slurry at a bottom surface thereof.

BACKGROUND ART

In the production of a separator for a battery with improved stability, dip coating is one of the methods of applying a solid coating to a web. Dip coating refers to a method that coats a slurry (coating solution) to a web by passing the web through the slurry held in a dipping bath, with the web traveling along a guide roll placed in the dipping bath.

The slurry coated to the web goes through a drying oven installed outside of the bath, drying a solvent included in the slurry and therefore leaving only solids and an adhesive coated to the web.

Meanwhile, a slurry includes about 80% of a solvent and the remaining 20% of solids and an adhesive, and due to the solids having a higher density than the solvent, a precipitation phenomena in solids may occur at a bottom surface of a bath during a reaction.

Figure 1:
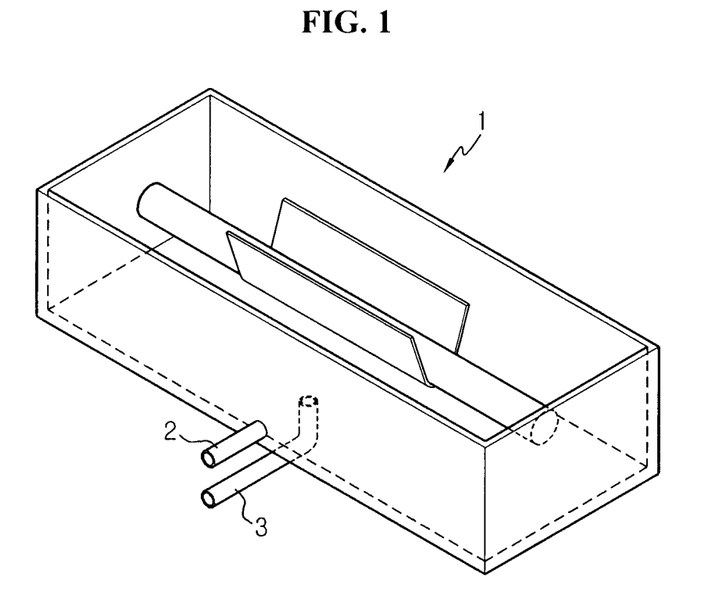
FIG. 1 is a perspective view illustrating a structure of a conventional dipping bath.

Referring to FIG. 1, a slurry flows into a bath 1 through an inlet 2 connected to a side surface of the bath, circulates through the bath, and flows out to a circulation tank through an outlet 3 connected to a bottom surface.

However, since this bath structure has an inherent drawback of reducing in a flow rate of the slurry in an area near the bottom surface, it is difficult to overcome the precipitation phenomena in solids occurring at the bottom surface. When an amount of precipitation increases, a coating process must be stopped and an operation of removing the precipitation must be performed, causing a reduction in productivity and a failure to achieve a desired coating property due to the solids being thrown away.

Accordingly, there is an urgent need for a solution to increase a flow rate of a slurry at a bottom surface of a bath to a maximum as well as allowing a uniform distribution of the slurry in the bath.

DISCLOSURE

Technical Problem

The present disclosure is designed to solve the problems of the related art, and therefore, the present disclosure is directed to providing a dipping bath that may allow a uniform distribution of a circulating slurry and increase a flow rate of the slurry at a bottom surface.

Technical Solution

To achieve the objects, a dipping bath includes a body to hold a slurry for dip coating, an inlet installed to flow the slurry from an outside of the body to an inside, and an outlet installed to discharge the slurry from the inside of the body to the outside, and one end of the inlet placed inside the body may be disposed facing a side surface of the body at a distance and may be tilted to a predetermined angle in a direction toward a bottom surface of the body.

The inlet may penetrate the body.

The inlet may be connected to the side surface of the body.

The inlet may be connected to an upper part on the side surface.

The inlet may be provided plurally, and among the plurality of inlets, at least any one pair may be installed such that one end of each of the inlets faces opposite directions.

The inlet may be inserted into the body through an open top of the body.

The outlet may be connected to the side surface of the body.

The outlet may be connected to a lowest part on the side surface.

The outlet may be connected to the bottom surface of the body.

The bottom surface may be slanted down from both sides to a center.

The outlet may be connected to a lowest location on the bottom surface.

At least a part on the side surface of the body may be inclined such that an inner space becomes narrow in a direction from top to bottom.

The inlet may be installed rotatably to enable adjustment of the tilting angle.

Advantageous Effects

According to one aspect of the present disclosure, adjustment of an incidence angle of a slurry flowing into a bath through an inlet may increase a flow rate of the slurry toward a bottom surface, as well as allowing a uniform distribution of solids contained in the slurry circulating through the bath.

According to another aspect of the present disclosure, an amount of solids settling at a bottom surface of a bath may be minimized by designing the bath to have an inclined bottom surface.

According to still another aspect of the present disclosure, a flow rate of a slurry at a bottom surface of a bath may be increased by designing the bath to have an incline over at least a part on a side surface of the bath with regard to the bottom surface to minimize an area of the bottom surface.

DESCRIPTION OF DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a dipping bath 10 according to an exemplary embodiment of the present disclosure is described with reference to FIGS. 2a and 2b.

Figure 2A:
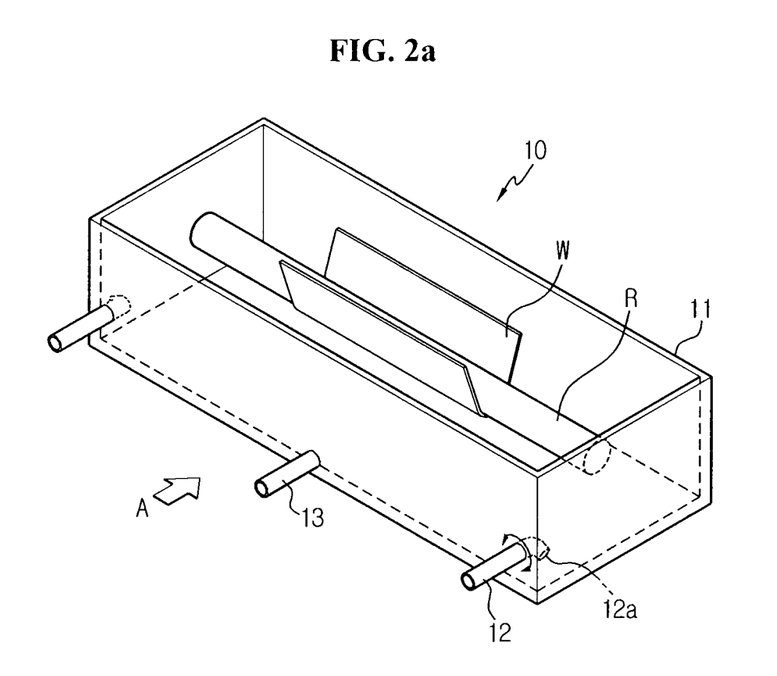
FIG. 2a is a perspective view illustrating a dipping bath according to an exemplary embodiment of the present disclosure.
Figure 2B:
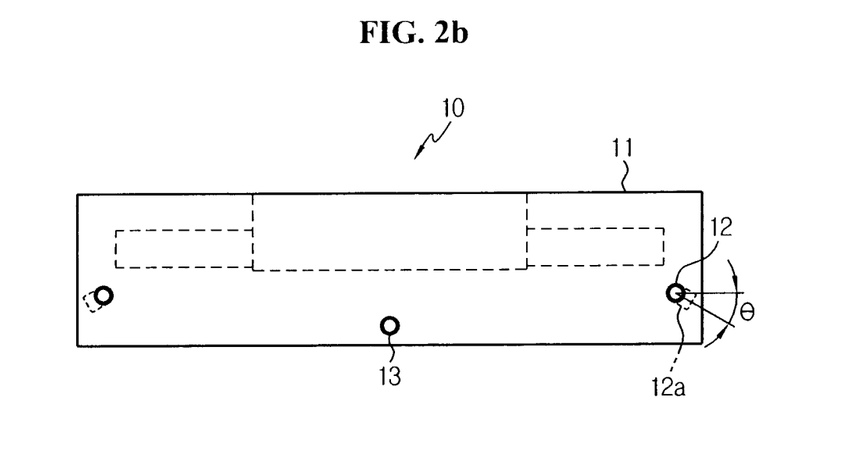
FIG. 2b is a view illustrating the dipping bath of FIG. 2a when viewed from a direction A.

FIG. 2a is a perspective view illustrating the dipping bath 10 according to an exemplary embodiment of the present disclosure, and FIG. 2b is a view illustrating the dipping bath 10 of FIG. 2a when viewed from a direction A.

Referring to FIGS. 2a and 2b, the dipping bath 10 according to an exemplary embodiment of the present disclosure includes a body 11, an inlet 12, and an outlet 13.

The body 11 corresponds to a container that holds a slurry used for dip coating, and may have a generally rectangular parallelepiped shape with an open top. The present disclosure does not limit the shape of the body 11, and it is obvious that any shape of a container having an open top, side surfaces, and a bottom surface falls within the scope of the present disclosure.

A guide roll R is installed within the body 11, and dip coating is performed by dipping a web W used to manufacture an electrode plate or a separator in a slurry while moving the web W along the guide roll R.

The inlet 12 corresponds to a passage that enables the slurry to flow from the outside the body 11 to the inside, and may be installed such that one end 12a is put inside through the body 11. In this case, there is no special limitation on a height at which the inlet 12 is installed, but the inlet 12 may be connected to an upper part on the side surface of the body 11 to allow good circulation of the slurry in the body 11. Here, the upper part on the side surface of the body 11 represents an area above the middle by which a height of the side surface is divided into halves.

The end 12a of the inlet 12 placed inside the body 11 is disposed facing one side surface of the body 11 at a predetermined distance away, and is tilted to a predetermined angle θ in a direction toward the bottom surface of the body 11. Thus, the slurry flowing into the body 11, through the inlet 12, moves down along the side surface of the body 11 and flows from the edge of the bottom surface to the center. This flow path of the slurry may minimize a reduction in flow rate at the bottom surface of the body 11, thereby minimizing precipitation phenomena in which solids contained in the slurry settles at the bottom surface.

The inlet 12 may be installed rotatably in a direction of an arrow (see FIG. 2a) to enable adjustment of the tilting angle θ based on the installation location.

Also, when the inlet 12 is provided plurally, at least one pair of inlets 12 among the plurality of inlets 12 may be installed such that one end 12a of each of the inlets 12 faces opposite directions to achieve good circulation of the whole slurry.

Meanwhile, although the drawing shows that the inlet 12 penetrates only the side surface disposed in the direction A among the side surfaces of the body 11, a location in which the inlet 12 is inserted into the body 11 is not limited thereby. That is, it is obvious that the inlet 12 may be inserted into the body 11 through the open top as well as the side surfaces disposed in other directions than the direction A.

Similarly, although the drawing shows that the inlet 12 is only installed at each opposite side of the body 11, the number of the inlets 12 is not limited thereby. That is, it is obvious that one inlet 12 or at least three inlets 12 may be installed in consideration of a size of the dipping bath 10 and the like.

The outlet 13 corresponds to a passage connected to the body 11 to discharge the slurry from the inside of the body 11 to the outside. There is no special limitation on an installation location of the outlet 13, but the outlet 13 may be connected to a lowest part on the side surface of the body 11 or the bottom surface to allow good discharge of the slurry. In this case, the slurry may be smoothly discharged through the outlet 13 by pressure due to its own weight of the slurry held in the body 11.

Meanwhile, although the drawing shows a case in which only one outlet 13 is provided, the number of the outlets 13 is not limited thereby. That is, it is obvious that at least two outlets 13 may be installed in consideration of a size of the dipping bath 10, the number of the inlets 12, and the like.

As described in the foregoing, the dipping bath 10 according to an exemplary embodiment of the present disclosure may minimize a phenomena in which the flow rate of the slurry reduces at the bottom surface, thereby minimizing a precipitation phenomena in which solids contained in the slurry settle at the bottom surface, since the dipping bath 10 has a structure of enabling the slurry flowing in the body 11 to flow toward the bottom surface after bumping against the side surface.

Hereinafter, a dipping bath 20 according to another exemplary embodiment of the present disclosure is described with reference to FIGS. 3a and 3b.

Figure 3A:
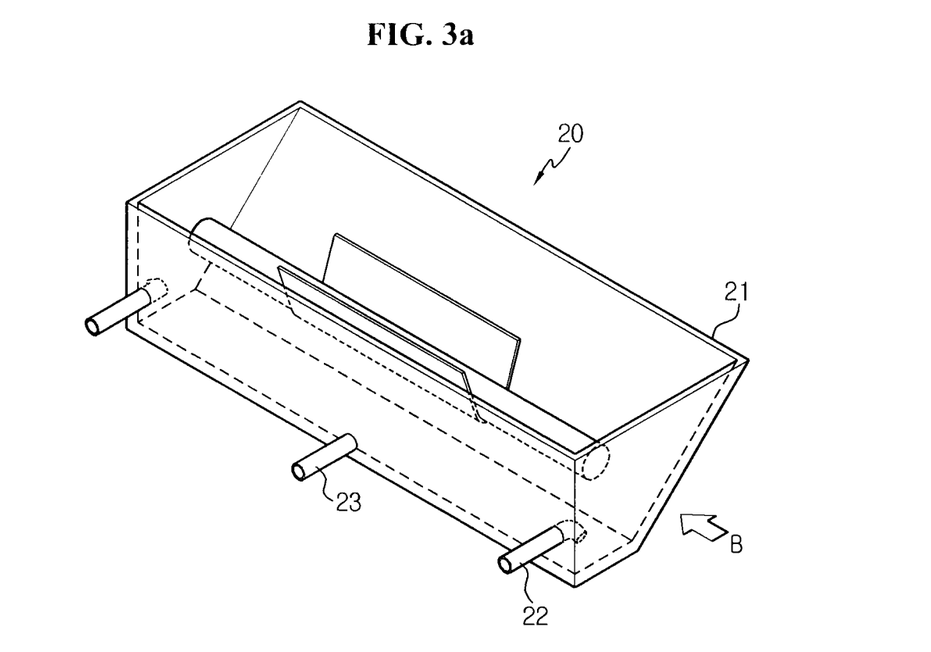
FIG. 3a is a perspective view illustrating a dipping bath according to another exemplary embodiment of the present disclosure.
Figure 3B:
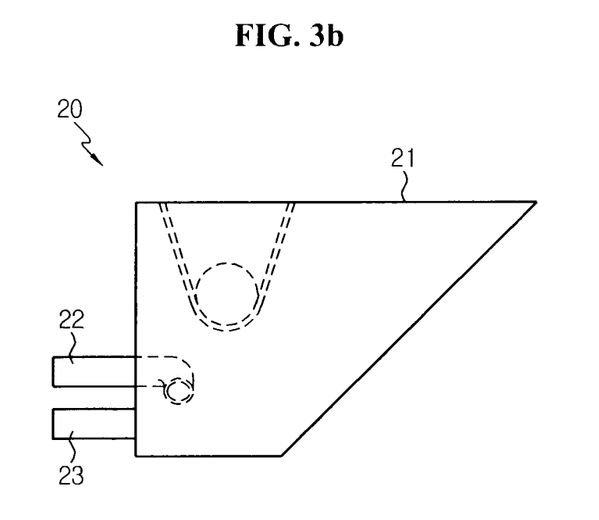
FIG. 3b is a view illustrating the dipping bath of FIG. 3a when viewed from a direction B.

FIG. 3a is a perspective view illustrating the dipping bath 20 according to another exemplary embodiment of the present disclosure, and FIG. 3b is a view illustrating the dipping bath 20 of FIG. 3a when viewed from a direction B.

Referring to FIGS. 3a and 3b, the dipping bath 20 according to another exemplary embodiment of the present disclosure includes a body 21, an inlet 22, and an outlet 23.

The dipping bath 20 is similar to the dipping bath 10 according to the previous embodiment except in the shape of a side surface of the body 21 and an area of a bottom surface. Accordingly, in the description of the dipping bath 20, an overlapping description is omitted herein, and the description is provided based on the shape of the side surface of the body 21 and the area of the bottom surface.

At least a part on the side surface of the body 21 is inclined such that an inner space becomes narrow from top to bottom. That is, the dipping bath 20 has such a shape that an area of the bottom surface is smaller than an area of the open top.

In this case, a flow rate of a slurry becomes faster as the slurry gets closer to the bottom surface of the body 21, and thereby a precipitation phenomena in which solids contained in the slurry settle at the bottom surface may be minimized.

Hereinafter, a dipping bath 20 according to still another exemplary embodiment of the present disclosure is described with reference to FIGS. 4*a* and 4*b*.

Figure 4A:
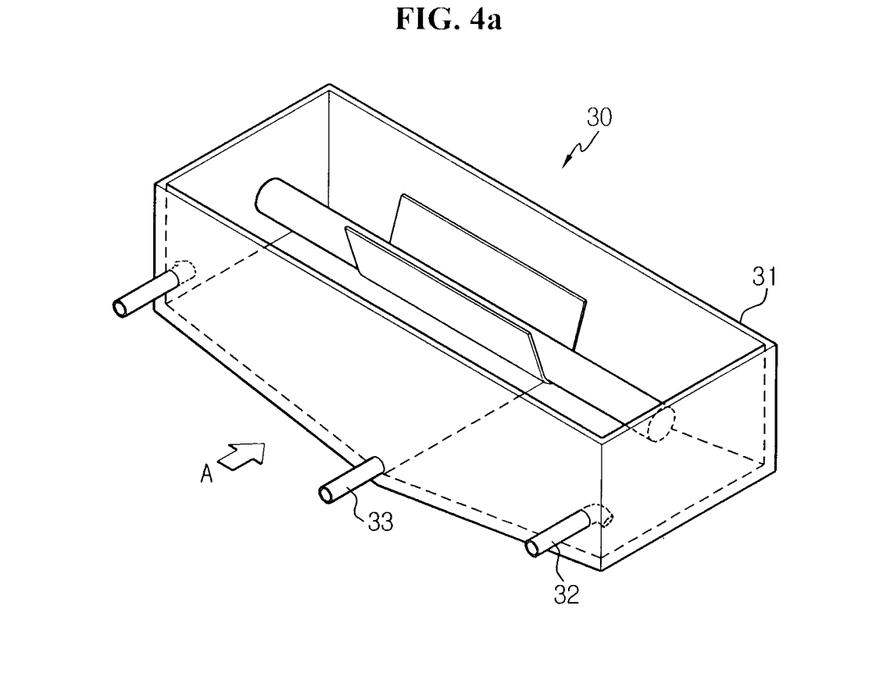
FIG. 4a is a perspective view illustrating a dipping bath according to still another exemplary embodiment of the present disclosure.
Figure 4B:
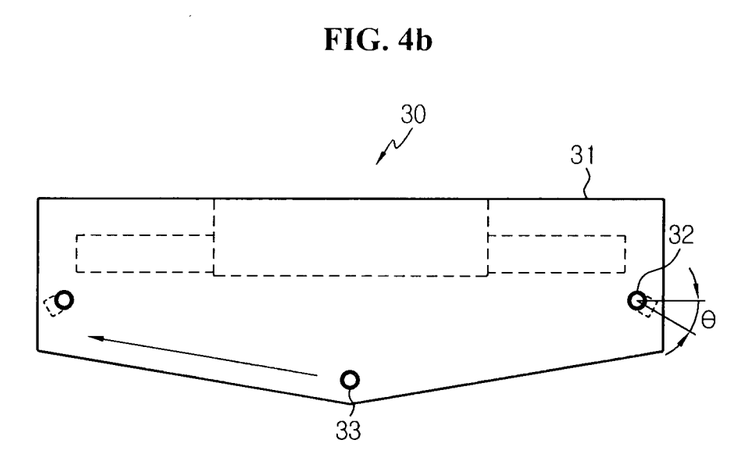
FIG. 4b is a view illustrating the dipping bath of FIG. 4a when viewed from a direction A.

FIG. 4*a* is a perspective view illustrating the dipping bath 30 according to still another exemplary embodiment of the present disclosure, and FIG. 4*b* is a view illustrating the dipping bath 30 of FIG. 4*a* when viewed from a direction A.

Referring to FIGS. 4*a* and 4*b*, the dipping bath 30 according to still another exemplary embodiment of the present disclosure includes a body 31, an inlet 32, and an outlet 33.

The dipping bath 30 is similar to the dipping baths 10 and 20 according to the previous embodiments except in the shape of a bottom surface of the body 31 and an installation location of the outlet 33. Accordingly, in the description of the dipping bath 30, an overlapping description is omitted herein, and the description is provided based on the shape of the bottom surface of the body 31 and the installation location of the outlet 33.

The bottom surface of the body 31 is inclined such that the body 31 is deeper toward the center. This shape of the bottom surface may minimize a phenomena in which a flow rate of the slurry reduces at the bottom surface, thereby not only minimizing a precipitation phenomena in which solids contained in the slurry settle at the bottom surface but also preventing the precipitation from residing at the bottom surface as well.

When the body 31 has an inclined bottom surface, the outlet 33 may be connected to a lowest location on the bottom surface, that is, a location at which inclined planes intersect. In this case, the outlet 33 may effectively discharge the slurry flowing down along the inclined plane to the outside of the body 31.

As described in the foregoing, due to having the inclined bottom surface, the dipping bath 30 according to still another exemplary embodiment of the present disclosure may prevent a phenomena in which the flow rate of the slurry reduces at the bottom surface more effectively, thereby reducing a precipitation phenomena in which solids contained in the slurry settle at the bottom surface more effectively.

Figure 5:
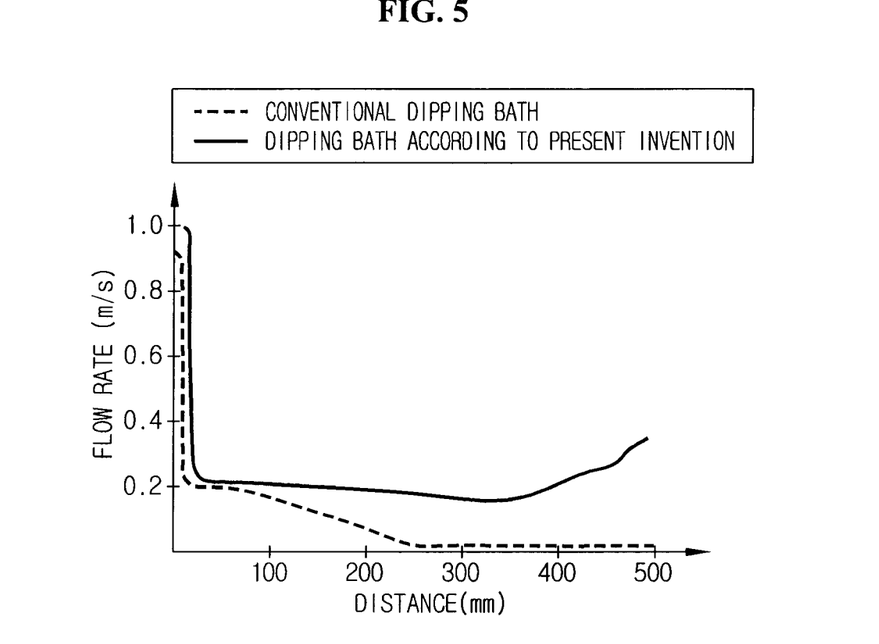
FIG. 5 is a graph illustrating a comparison of a flow rate distribution of a slurry appearing in the vicinity of a bottom surface of a dipping bath according to the present disclosure and a flow rate distribution of a slurry appearing in the vicinity of a bottom surface of a conventional dipping bath.

Meanwhile, referring to FIG. 5, a flow rate distribution of the slurry appearing in each of the dipping bath 30 according to the present disclosure and the conventional dipping bath 1 may be compared.

FIG. 5 is a graph illustrating a comparison of a flow rate distribution of a slurry appearing in the vicinity of the bottom surface of the dipping bath according to the present disclosure and a flow rate distribution of a slurry appearing in the vicinity of the bottom surface of the conventional dipping bath.

Specifically, a horizontal axis on the graph of FIG. 5 represents a distance (mm) from an outlet installed in a dipping bath, that is, when FIG. 4*b* is taken for instance, a movement distance from the outlet 33 to the side surface of the dipping bath along a direction of an arrow, and a longitudinal axis represents a flow rate (m/s) at a corresponding point.

Referring to FIG. 5, with regard to a flow rate distribution of a slurry appearing in an area near the bottom surface, it can be seen that the dipping bath 30 according to the present disclosure shows a range of about 0.20 m/s to about 0.35 m/s, whereas the conventional dipping bath 1 shows a range of about 0 to about 0.20 m/s, except an area immediately adjacent to the bottom surface.

This flow rate difference at the bottom surface results in a difference between a content ratio of the solids to the slurry (weight of the solids/weight of the slurry) appearing at the bottom surface of the dipping bath 30 according to the present disclosure and a content ratio of the solids to the slurry appearing at the bottom surface of the conventional dipping bath 1.

Figure 6:
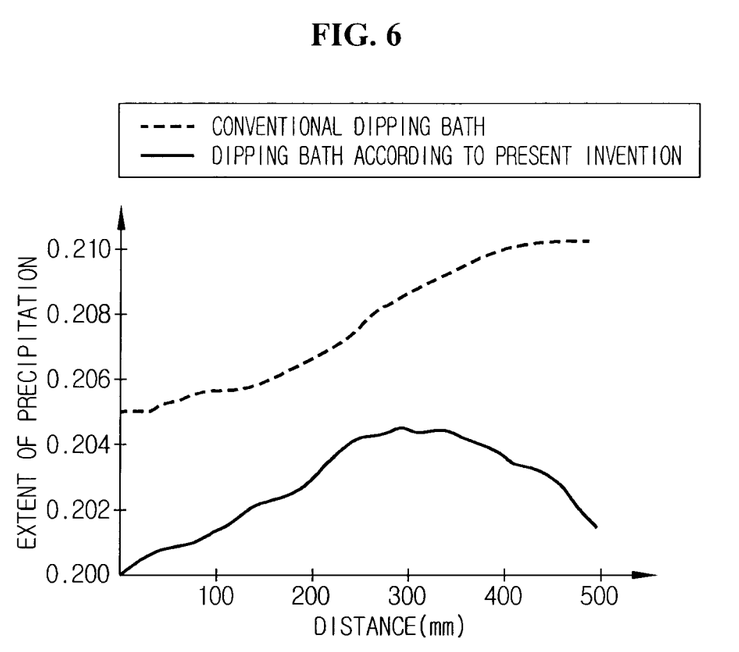
FIG. 6 is a graph illustrating a comparison of a content ratio distribution of solids appearing in the vicinity of a bottom surface of a dipping bath according to the present disclosure and a content ratio distribution of solids appearing in the vicinity of a bottom surface of a conventional dipping bath.

FIG. 6 is a content ratio distribution graph illustrating a content ratio distribution of solids appearing in the vicinity of the bottom surface of the dipping bath according to the present disclosure and a content ratio distribution of solids appearing in the vicinity of the bottom surface of the conventional dipping bath.

Specifically, similar to FIG. 5, a horizontal axis on the graph of FIG. 6 represents a distance from the outlet 33, and a longitudinal axis represents an extent of precipitation, that is, a ratio of a weight of the solids to a weight of the slurry.

Referring to FIG. 6, a content ratio of the solids to the slurry appearing at the bottom surface of the dipping bath 30 according to the present disclosure is found to be generally uniform, while a content ratio of the solids to the slurry in an area near the bottom surface of the conventional dipping bath 1 is found to be more non-uniform than that of the dipping bath 30 according to the present disclosure, and moreover, its value is found to be higher.

Specifically, the dipping bath 30 according to the present disclosure shows an extent of precipitation between about 0.200 and about 0.205, but the conventional dipping bath 1 shows an extent of precipitation between about 0.205 and about 0.210.

As a content ratio of the solids in the slurry is found to be lower, an amount of solids settling at the bottom surface reduces, and thus, it can be seen through this content ratio distribution graph of the solids that the dipping bath 30 according to the present disclosure exhibits a better performance than the conventional dipping bath 1.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A dipping bath comprising:
   a body to hold a slurry for dip coating;
   an inlet installed to flow the slurry from an outside of the body to an inside; and
   an outlet installed to discharge the slurry from the inside of the body to the outside,
   wherein one end of the inlet placed inside the body is disposed facing a side surface of the body at a distance and is tilted to a predetermined tilting angle in a direction toward a bottom surface of the body so that the slurry moves down along the side surface of the body and then flows from and edge of the bottom surface of the body to a center thereof, wherein the inlet is installed rotatably to enable adjustment of the predetermined tilting angle, wherein the bottom surface comprises two inclined planes slanting downwards and meeting at a point at a center of the body such that the body is deeper toward the center, and wherein the outlet is located at a lowest part of the body where the two inclined planes intersect.

2. The dipping bath according to claim 1, wherein the inlet penetrates the body.

3. The dipping bath according to claim 2, wherein the inlet is connected to the side surface of the body.

4. The dipping bath according to claim 1, wherein the inlet comprises a plurality of inlets, and among the plurality of inlets, at least any one pair is installed such that one end of each of the inlets of the at least any one pair faces opposite directions.

5. The dipping bath according to claim 1, wherein at least a part on the side surface of the body is inclined such that an inner space becomes narrow in a direction from top to bottom.

6. The dipping bath according to claim 1, wherein the inlet is located at an upper part of the side surface of the body.

7. The dipping bath according to claim 1, further comprising a guide roll.

* * * * *